(12) United States Patent
Aljallis et al.

(10) Patent No.: US 11,498,758 B2
(45) Date of Patent: Nov. 15, 2022

(54) SYSTEMS AND METHODS FOR FILLING CONTAINERS

(71) Applicant: Walmart Apollo, LLC, Bentonville, AR (US)

(72) Inventors: Elias Aljallis, Howard Beach, NY (US); Vikranth Gopalakrishnan, North Brunswick, NJ (US); Ronald S. Kyslinger, York, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 376 days.

(21) Appl. No.: 16/448,491

(22) Filed: Jun. 21, 2019

(65) Prior Publication Data

US 2020/0002032 A1 Jan. 2, 2020

Related U.S. Application Data

(60) Provisional application No. 62/692,522, filed on Jun. 29, 2018, provisional application No. 62/692,544, (Continued)

(51) Int. Cl.
| | |
|---|---|
| *B65G 1/06* | (2006.01) |
| *B60P 3/00* | (2006.01) |
| *B65G 1/04* | (2006.01) |
| *G05D 1/02* | (2020.01) |
| *B65G 47/90* | (2006.01) |
| *B65B 5/10* | (2006.01) |
| *B65B 43/56* | (2006.01) |
| *B65G 1/137* | (2006.01) |

(52) U.S. Cl.
CPC ............... *B65G 1/06* (2013.01); *B60P 3/007* (2013.01); *B65B 5/10* (2013.01); *B65B 43/56* (2013.01); *B65G 1/0457* (2013.01); *B65G 1/0492* (2013.01); *B65G 47/90* (2013.01); *G05D 1/0212* (2013.01); *B65G 1/1373* (2013.01); *G05D 2201/0216* (2013.01)

(58) Field of Classification Search
CPC .................................................. B65G 1/0457
See application file for complete search history.

(56) References Cited

U.S. PATENT DOCUMENTS

| | | | | |
|---|---|---|---|---|
| 3,448,870 A | * | 6/1969 | Boissevain | B65G 1/1378 414/273 |
| 4,838,036 A | * | 6/1989 | Norrie | A22B 7/005 198/465.4 |

(Continued)

*Primary Examiner* — Jonathan Snelting
(74) *Attorney, Agent, or Firm* — Duane Morris LLP; Manita Rawat

(57) ABSTRACT

A rail can include an entry portion, an exit portion, and a middle portion disposed between the entry and exit portions. The middle portion can be lower than the entry and exit portions. The rail can be configured to couple with a container such that the container is movable, along the rail, from the entry portion to the exit portion. A first storage rack can be disposed on a first side of the rail middle portion and a second storage rack can be disposed on an opposing side of the rail middle portion. A processing system can be configured to: receive an order; analyze the order based on an inventory of the first storage rack and the second storage rack; and cause the container to move from the rail entry portion to the rail middle portion based on the analysis.

8 Claims, 9 Drawing Sheets

Related U.S. Application Data filed on Jun. 29, 2018, provisional application No. 62/692,500, filed on Jun. 29, 2018, provisional application No. 62/692,606, filed on Jun. 29, 2018.

(56) References Cited

U.S. PATENT DOCUMENTS

| | | | |
|---|---|---|---|
| 9,957,107 B2* | 5/2018 | Peng | B65G 1/0485 |
| 10,343,844 B2* | 7/2019 | Edme | G01V 13/00 |
| 2008/0086231 A1* | 4/2008 | Kim | B25J 15/0491 |
| | | | 700/215 |
| 2018/0244473 A1* | 8/2018 | Mathi | B65B 35/44 |
| 2019/0177086 A1* | 6/2019 | Mathi | B65G 1/1378 |

\* cited by examiner

SYSTEMS AND METHODS FOR FILLING CONTAINERS

CROSS-REFERENCE

This application claims priority to U.S. Provisional Patent Application No. 62/692,522 entitled "Container Filling," U.S. Provisional Patent Application No. 62/692,544 entitled "Container Quick-Release," U.S. Provisional Patent Application No. 62/692,550 entitled "Robotic Container Connection," U.S. Provisional Patent Application No. 62/692,606 entitled "Container Transportation," each filed Jun. 29, 2018 and each of which are hereby incorporated by reference in their entireties.

TECHNICAL FIELD

Among other things, the present application relates to filling containers. The containers can be slideably coupled to a rail.

BACKGROUND

Warehouses can store many different kinds of items in bins (i.e., longer term storage containers). When a customer places a remote order (e.g., an online order), an employee can load the ordered items from the bins into pockets (i.e., shorter term storage containers). The pockets can be moveably suspended from a rail system. Motors in the rail system can slide (e.g., roll) the pockets along tracks from a loading station to a packing station.

When a pocket arrives at a packing station, an employee can manually remove the pocket and/or the item stored therein. The employee can place the item in a box (e.g., a shipping container). The process can be repeated until the box contains the customer's complete order. The employee can mark the packed box for shipment. A customer's order can include many different items and a warehouse can receive many different simultaneous orders. As a result, the rail system may incorporate thousands of pockets. When pockets are transferred to various locations in the warehouse, an employee may need to manually move the pockets and/or manually remove the pockets from the rail system to another system. Such manual removal can be time-consuming.

SUMMARY

A rail can include an entry portion, an exit portion, and a middle portion disposed between the entry and exit portions. The middle portion can be lower than the entry and exit portions. The rail can be configured to couple with a container such that the container is movable, along the rail, from the entry portion to the exit portion. A first storage rack can be disposed on a first side of the rail middle portion and a second storage rack can be disposed on an opposing side of the rail middle portion. A processing system can be configured to: receive an order; analyze the order based on an inventory of the first storage rack and the second storage rack; and cause the container to move from the rail entry portion to the rail middle portion based on the analysis.

BRIEF DESCRIPTION OF THE FIGURES

The Figures show some of the illustrative embodiments disclosed herein. As further explained below, the claimed inventions are not limited to the illustrative embodiments and therefore are not limited to the embodiments shown in the Figures.

For clarity and ease of reading, some Figures omit views of certain features. The relative dimensions shown in the Figures can be aspects of a few illustrative embodiments. Therefore, relative dimensions shown in the Figures can serve as original support. Other illustrative embodiments lack any dimensional relationship to the Figures. The claimed inventions are not limited to any absolute or relative dimensions shown in the Figures unless explicitly stated otherwise.

The present disclosure generally uses the terms "longitudinal", "transverse", and "vertical" to give the reader context when viewing the Figures. Referring to the Figures, depth along the X-axis can be "transverse", depth along the Y-axis can be "longitudinal", and depth along the Z-axis can be "vertical". The X, Y, and Z-axes are consistent across the Figures.

Figure 1:
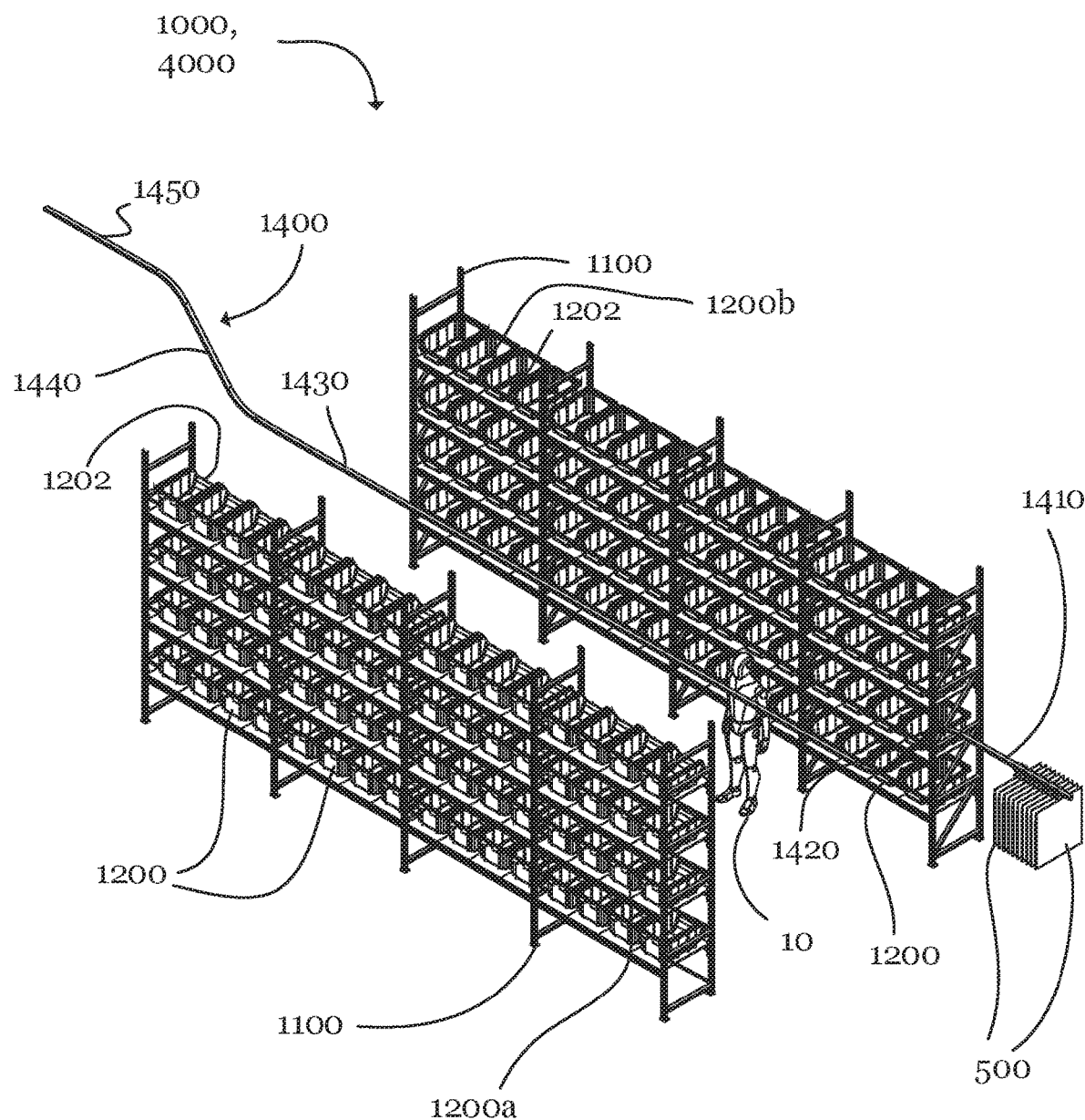

FIG. 1 is an isometric view of a filling station, in accordance with some embodiments.

Figure 2:
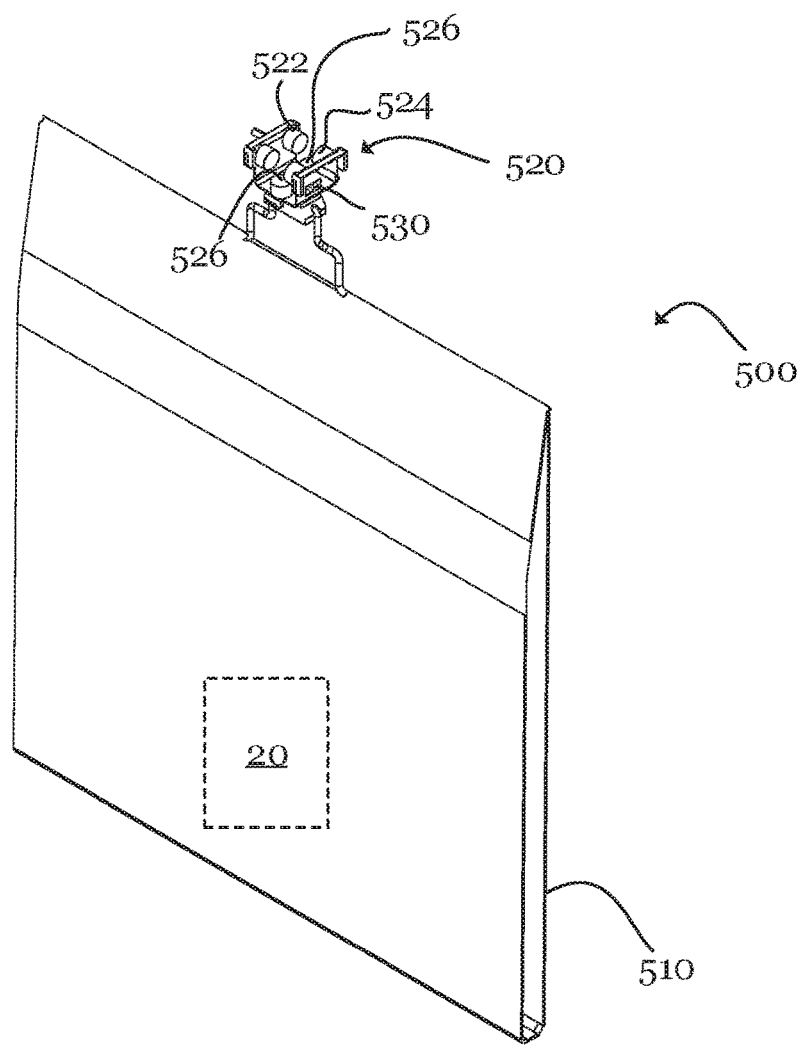
Figure 2:
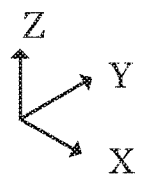

FIG. 2 is an isometric view of a container, in accordance with some embodiments.

Figure 3:
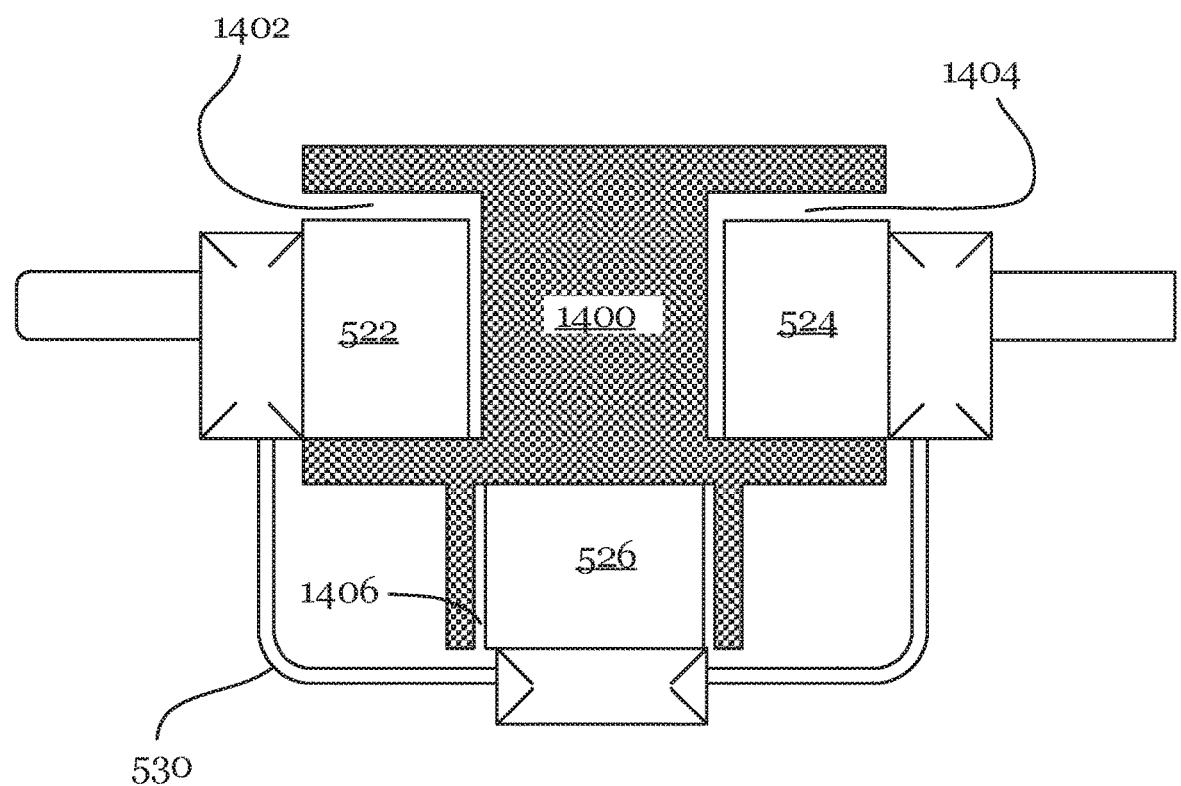

FIG. 3 is a side elevational view of the container and a cross sectional elevational view of a rail, in accordance with some embodiments.

Figure 4:
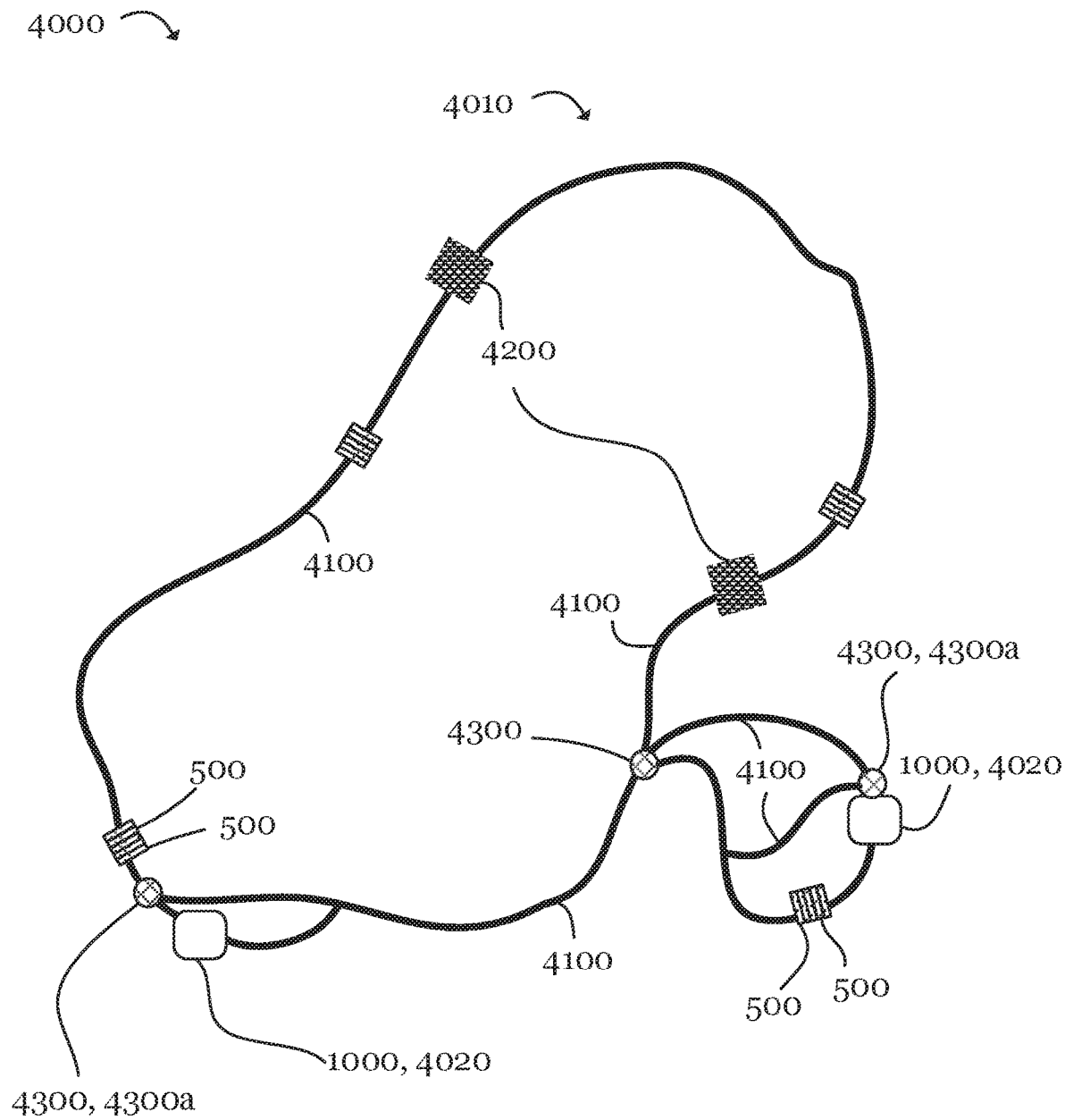

FIG. 4 is a schematic plan view of a rail system, in accordance with some embodiments.

Figure 5:
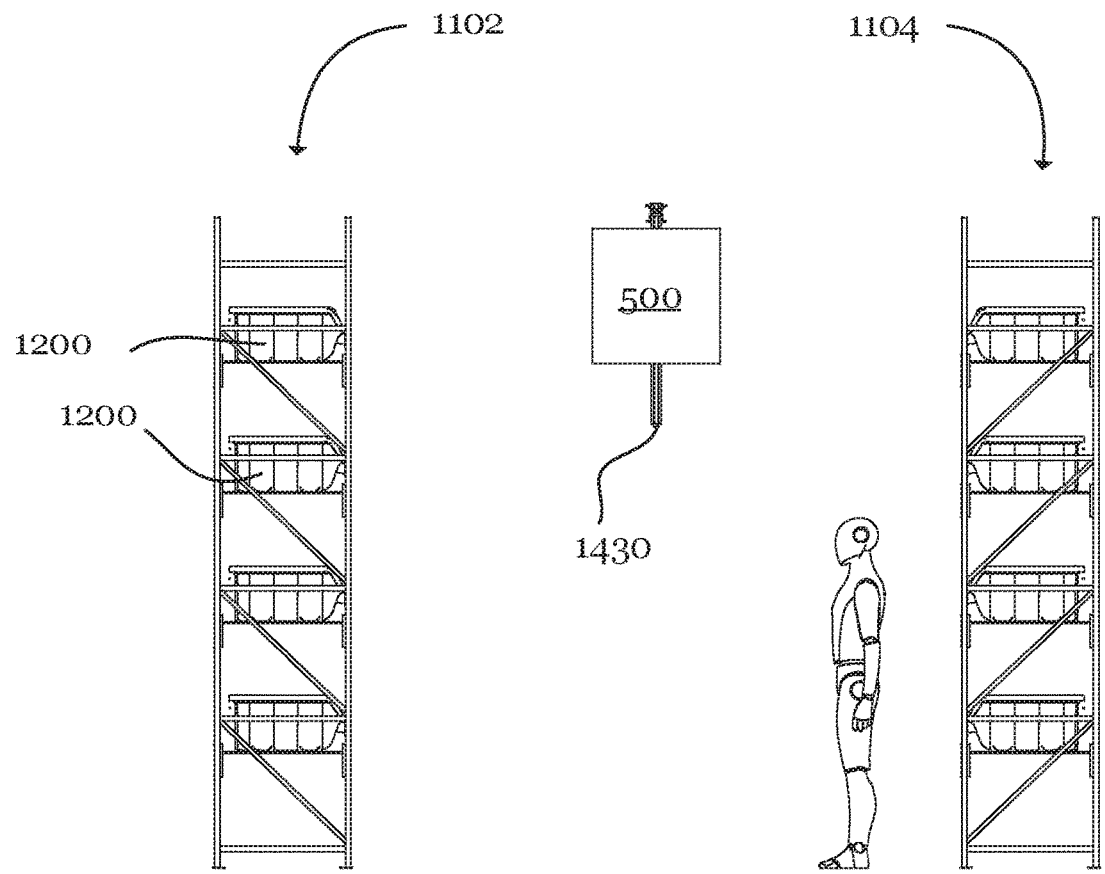

FIG. 5 is a front elevational view of the filling station, in accordance with some embodiments.

Figure 6:
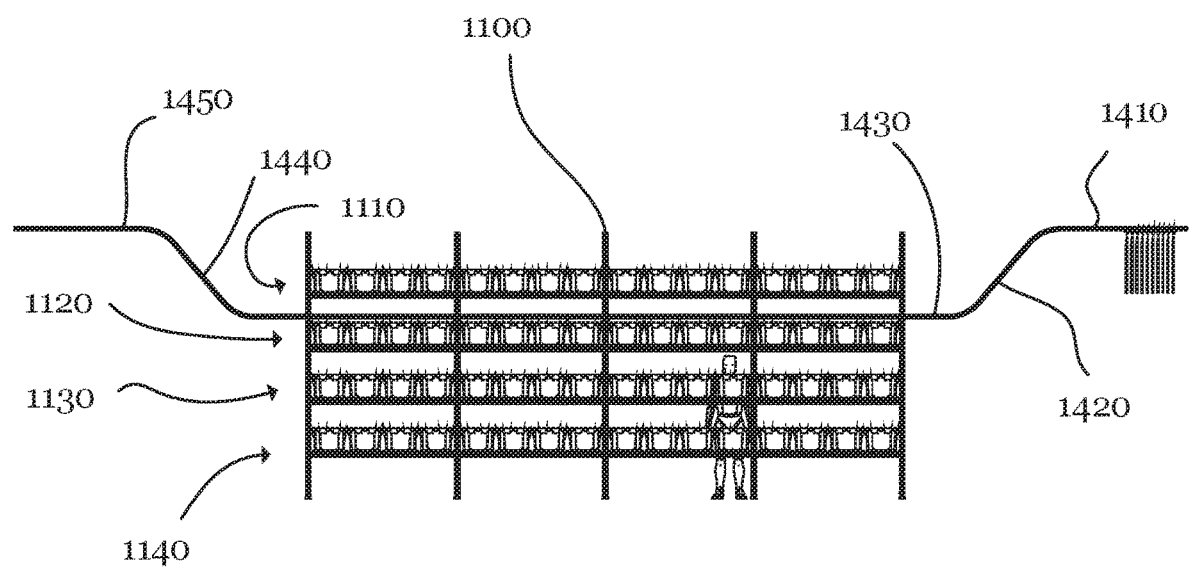

FIG. 6 is a side elevational view of the filling station, in accordance with some embodiments.

Figure 7:
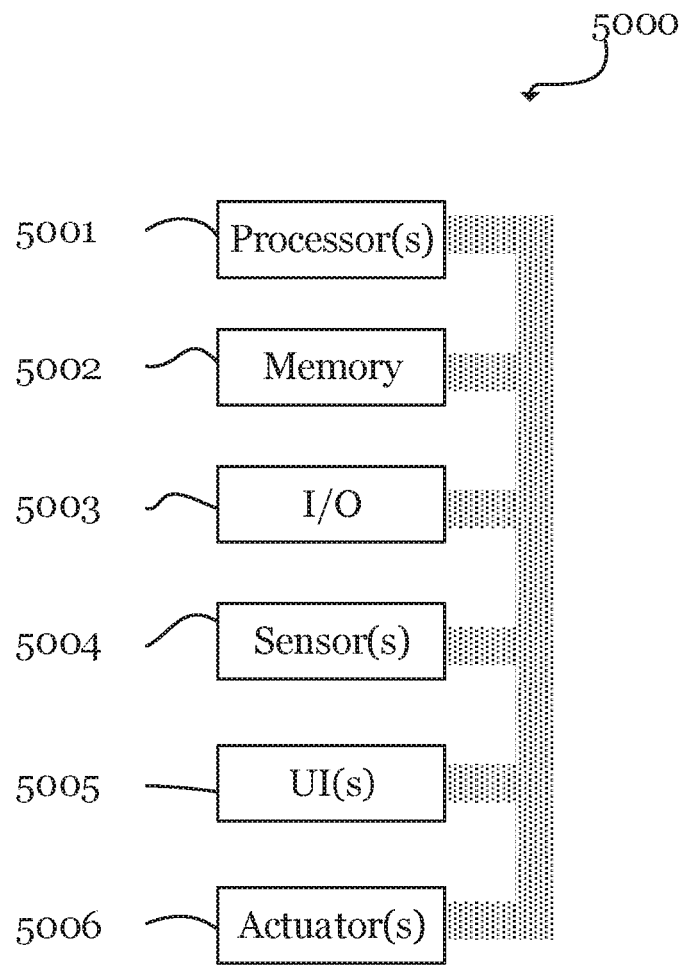

FIG. 7 is a block diagram of a processing system, in accordance with some embodiments.

Figure 8:
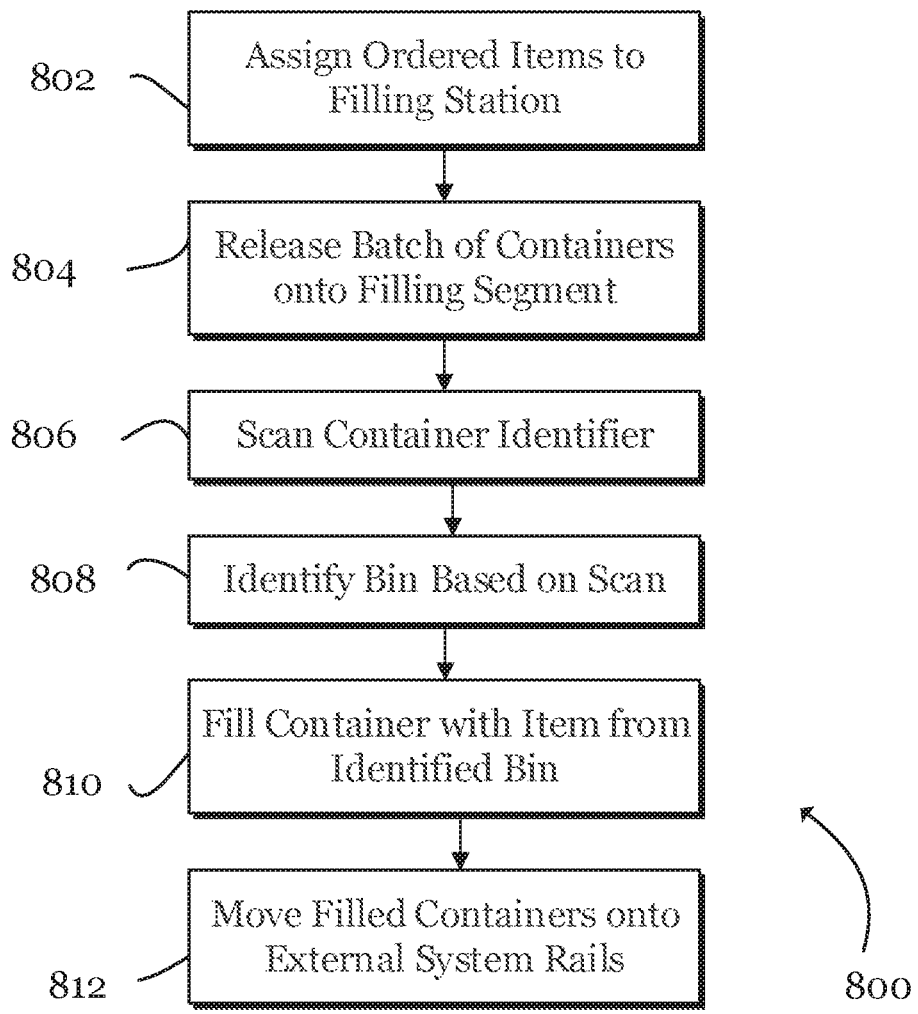

FIG. 8 is a block diagram of a method, in accordance with some embodiments.

Figure 9:
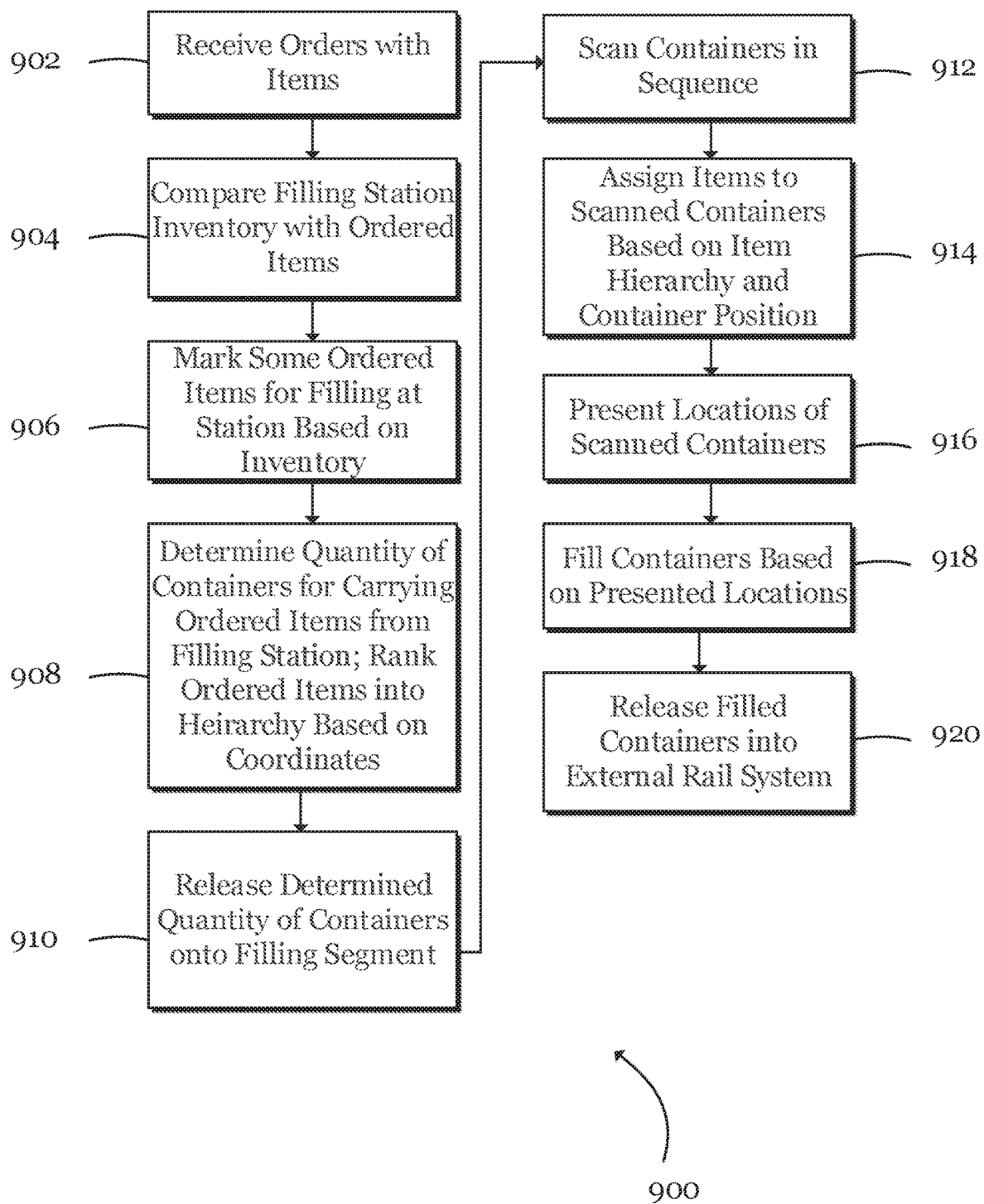

FIG. 9 is a block diagram of a method, in accordance with some embodiments.

DETAILED DESCRIPTION

While the features, methods, devices, and systems described herein may be embodied in various forms, there are shown in the drawings, and will hereinafter be described, some illustrative (i.e., example) embodiments. The claimed inventions are not limited to the illustrative embodiments. Therefore, some implementations of the claimed inventions will have different features than those set out in this disclosure.

Further, implementations of the claimed inventions can make changes with respect to the claims without departing from the spirit or scope of the application. Therefore, the claimed inventions are intended to embrace their full-range of equivalents.

Unless otherwise indicated, any directions reflect the orientations of the components shown in the corresponding drawings and do not limit the scope of the present disclosure. Any absolute term (e.g., large, small) can be replaced with a corresponding relative term (e.g., larger, smaller).

FIG. 1 shows a filling station 1000. Filling station 1000 can be an aspect of a rail system 4000 (discussed below). Filling station 1000 can include shelves 1100 (also called storage racks), storage bins 1200, a rail 1400, and containers 500. Filling station 1000 can generally operate as follows: rail system 4000 can direct empty containers 500 to filling station 1000 via rail 1300. A user 10 (e.g., a person, a robot, etc.) can remove items 20 from storage bins 1200 and place the items in containers 500 suspended on rail 1400. The filled containers 500 can then be sent to another portion of rail system 4000 (e.g., a shipping station).

Referring to FIGS. 1, 2, and 3, container 500 can include a vessel 510 for being filled with items 20, and a container connection assembly (CCA) 520 for coupling vessel 510 with rail 1300. CCA 520 can include a plurality of bearings 522, 524, 526 (i.e., wheels) slideably disposed within rail channels 1302, 1304, 1306. Referring to FIG. 2, container 500 can include a scanable identifier 530 (e.g., a barcode, a RFID tag, etc.).

Referring to FIGS. 1 and 6, rail 1400 can include a raised and longitudinally extending entry segment 1410, an intermediate downsloping segment 1420, a lowered and longitudinally extending filling segment 1430, an intermediate upsloping segment 1440, and a raised and longitudinally extending exit segment 1450. Entry segment 1410 can be for receiving containers 500 from external rail system 4010. Exit segment 1450 can be for returning containers to external rail system 4010. Entry segment 1410 and exit segment 1450 can be collinear. Filling segment 1430 can be parallel with both entry segment 1410 and exit segment 1450. Entry segment 1410 can be called a first or entry rail portion, intermediate downsloping segment 1420 can be called a second rail portion, filling segment 1430 can be called a third or middle rail portion, fourth segment 1440 can be called a fourth rail portion, and exit segment 1450 can be called a fifty or exit rail portion.

Referring to FIG. 4, a rail system 4000 can include an internal system 4020 and an external system 4010. Internal system 4020 can be the portion of rail system 4000 corresponding to filling station 1000 (i.e., station rail 1400). External system 4010 can be the portion of rail system 4000 external to filling station 1000.

Rail system 4000 can include system rails 4100 (e.g., station rail 1400), motors 4200, switches 4300, and containers 500. System rails 4100 can have the same structure as station rail 1400. Motors 4200 can be for pushing containers 500 along system rails 4100. Switches 4300 can be for directing containers 500 at points where system rails 4100 diverge. Switch 4300a can be for directing containers 500 into filling station 1000. As shown in FIG. 4, rail system 4000 can include a plurality of filling stations 1000.

Referring to FIGS. 1 and 5, storage shelves 1100 can be disposed on both transverse sides of station rail entry segment 1410. As shown in FIG. 5, storage shelves 1100 can include first transverse shelves 1102 and second transverse shelves 1104. As shown in FIG. 6, storage shelves 1100 can longitudinally extend for a distance less than station rail filling segment 1430. As shown in FIG. 6, the longitudinal ends of each storage shelves 1100 can be disposed longitudinally between the longitudinal ends of station rail filling segment 1430. Storage shelves 1100 can run parallel to station rail filling segment 1430.

First storage shelf 1102 and second storage shelf 1104 can be equidistant from station rail filling segment 1430, as shown in FIG. 5. For example, each storage shelf 1102 can be less than 1, 2, 3, 5, etc. meters from station rail filling segment 1430. Storage shelves 1100 can include a plurality of levels 1110-1140 (labeled in FIG. 6). In FIGS. 1 and 6, four levels are shown. As shown in FIG. 6, station rail filling segment 1430 can be disposed vertically below the uppermost storage shelf level 1110.

Referring to FIG. 1, an equal number of storage bins 1200 can be disposed on each storage shelf level 1100. As shown in FIG. 1, each storage shelf level 1100 of first storage shelves 1102 and second storage shelves 1104 can include sixteen equidistantly spaced storage bins 1200. Storage bins 1200 can be bolted to shelves 1100 to discourage relative movement. Both storage shelves 1100 and rail 1300 can be fixed to a common surface (e.g., a warehouse floor). Each storage bin 1200 can be identical. Each storage bin 1200 can include three raised sidewalls (not labeled) and a lowered sidewall 1202. Each lowered sidewall 1202 can face station rail filling segment 1430.

Referring to FIG. 7, rail system 4000 can include a processing system 5000. Processing system 5000 can include one or more processors 5001, memory 5002, one or more input/output devices 5003, one or more sensors 5004, one or more user interfaces 5005, and one or more actuators 5006.

Processors 5001 can include one or more distinct processors, each having one or more cores. Each of the distinct processors can have the same or different structure. Processors 5001 can include one or more central processing units (CPUs), one or more graphics processing units (GPUs), circuitry (e.g., application specific integrated circuits (ASICs)), digital signal processors (DSPs), and the like. Processors 5001 can be mounted on a common substrate or to different substrates.

Processors 5001 are configured to perform a certain function, method, or operation at least when one of the one or more of the distinct processors is capable of executing code, stored on memory 5002 embodying the function, method, or operation. Processors 5001 can be configured to perform any and all functions, methods, and operations disclosed herein.

For example, when the present disclosure states that processing 5000 performs/can perform task "X" (e.g., task "X is performed"), such a statement should be understood to disclose that processing system 5000 can be configured to perform task "X". Rail system 4000 and processing system 5000 are configured to perform a function, method, or operation at least when processors 5001 are configured to do the same. As used herein the term "determine", when used in conjunction with processing system 5000 can mean detecting, receiving, looking-up, computing, and the like.

Memory 5002 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 5002 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 5002.

Input-output devices 5003 can include any component for trafficking data such as ports, antennas (i.e., transceivers), printed conductive paths, and the like. Input-output devices 5003 can enable wired communication via USB®, DisplayPort®, HDMI®, Ethernet, and the like. Input-output devices 5003 can enable electronic, optical, magnetic, and holographic, communication with suitable memory 5003. Input-output devices can enable wireless communication via WiFi®, Bluetooth®, cellular (e.g., LTE®, CDMA®, GSM®, WiMax®, NFC®), GPS, and the like. Input-output devices 5003 can include wired and/or wireless communication pathways.

Sensors 5004 can capture physical measurements of environment and report the same to processors 5001. Examples of sensors 5004 include temperature sensors, image sensors, LiDAR sensors, etc. User interface 5005 can include a display (e.g., LED touchscreens (e.g., OLED touchscreens), physical buttons, speakers, microphones, keyboards, and the like. Actuators 5006 can enable processors 5001 to control mechanical forces. Actuators 5006 can include motors, brakes, hydraulics, etc.

Processing system 5000 can be distributed (e.g., primary non-volatile memory can be disposed in a first remote server and the other modules can be disposed in a second remote server). Processing system 5000 can have a modular design where certain modules have a plurality of the features shown in FIG. 7. For example, one module can include one or more processors 5001, memory 5002, I/O 5003, and sensors 5004.

FIG. 8 is a block diagram of a method 800 for filling empty containers 5000 with items 20 disposed in bins 1200. Processing system 5000 can be configured to perform method 800.

At block 802, PS 5000 can assign ordered items to be filled at station 1000. At block 804, PS 5000 can cause a batch of containers 500 to roll from station rail entry segment 1410 to station rail filling segment 1430. The number of containers 500 in the batch can be based on the number of ordered items assigned to filling station 1000.

At block 804, the batch of containers 500 can stop at station rail filling segment 1430 by, for example, (a) bumping against other containers 500 already stopped on station rail filling portion 1430, (b) frictional force between bearings 522, 524, 526 and rail channels 1302, 1304, 1306, and/or (c) gravitational force from station rail intermediate segment 1440.

At block 806, a user can scan the identifier 530 of a container 500 with a mobile device (not shown). At block 808, the mobile device can identify a storage bin 1200 based on the scan. For example, the mobile device can identify coordinates of a specific storage bin 1200 on a display of the mobile device. Alternatively, or in addition, the mobile device can transmit a signal causing a storage bin 1200 to illuminate. Thus, each storage bin 1200 can include lights configured to illuminate in response to a mobile device signal. After the user scans a subsequent container 500, the lights of the previously illuminated storage bin 1200 can turn off and the lights corresponding to the next storage bin 1200 can turn on.

At block 810, the user can pick an item from the identified storage bin 1200, then insert the picked item into container 500. The user can repeat blocks 808 and 810 until each container 500 in the batch has been filed. At block 812, PS 5000 can cause filled containers 500 to exit filling station 1100 and return to external system rails 4010 by way of station rail segments 1400 and 1500.

FIG. 9 is a block diagram of a method 900 for filling empty containers 500 with items 20 disposed in bins 1200. As with all methods and operations disclosed herein, a processing system ("PS") 5000 can be configured to perform method 900.

At block 902, PS 5000 can receive a plurality of customer orders, each containing a plurality of items. At block 904, PS 5000 can compare the item inventory of filling station 1000 to the ordered items (i.e., analyze the customer orders based on the inventory of filling station 1000). At block 906, PS 5000 can mark a plurality of the ordered items 20 to be filled at station 1000 based on the comparison. At block 908, PS 5000 can determine a quantity of containers 500 needed to carry the assigned items 20 from filling station 1000. According to some embodiments, a separate container 500 is required for each assigned item 20.

A plurality of containers 500 can be stopped and waiting on station rail entry segment 1410. At block 910, PS 5000 can release the determined quantity of containers 500 (i.e., a batch of containers 500) into station rail filling segment 1430 by, for example, causing a motor to move the determined quantity of containers 5000 from station rail entry segment 1410 onto station rail intermediate segment 1420. Alternatively, or in addition, PS 5000 can release the determined quantity of containers 500 by causing switch 4300a to direct empty incoming containers 500 into filling station 1000. According to some embodiments, only one batch of containers 500 is disposed on station rail filling segment 1430 at a time. PS 5000 can delay releasing a new batch of containers 500 onto rail filling segment 1430 until determining that the prior batch of containers 500 has exited station rail filling segment 1430.

At block 912, user 10 can scan the container identifier 530 of each container 500 in the released batch (e.g., via a mobile device, which can be an aspect of PS 5000). PS 5000 can update an internal database based on the scan. According to some embodiments, PS 5000 has not received the identifiers 530 of containers 500 in the batch until the scanning. Instead, PS 5000 has only stored the number of containers 500 and the identity of ordered items 20 assigned to filling station 1000.

At block 914, PS 5000 can associate the identifier 530 of a scanned container 500 with an ordered item 20 by, for example, updating the internal database after the scan. At block 914, PS 5000 can assign an item 20 to each scanned container 500 based on (a) the position of the container 500 in the batch of released containers 500 and (b) the position of the storage bin 1200 holding the assigned item 20 (i.e., the position of the assigned item 2o). The position of a container 500 in the batch can be based on scan order—PS 5000 can assume that the first scanned container 500 is in the first position (i.e., leading position), the second scanned container 5000 is in the second position (i.e., directly trailing the first scanned container 500), and so on.

According to some embodiments, PS 5000 can assign each of the items 20 held in first storage shelves 1102, then assign each of the items 20 stored in second storage shelves 1104. According to an example, ten containers 500 are released in a batch and each container 500 is to be filled with one item 20 from filling station 1000. Four items 20 are held in first storage shelves 1102 and six items 20 are held in second storage shelves 1104. PS 5000 can assign the four items 20 in first storage shelves 1102 to the first four containers 500 to be scanned and the six items 20 in second storage shelves 1104 to the final six containers 500 to be scanned.

According to some embodiments, PS 5000 can map a coordinate to each storage bin 1200 (i.e., each item 20) based on its position in filling station 1000. For example, each storage bin 1200 can have coordinates (a, b, c) where coordinate "a" identifies which storage shelf 1100 holds the storage bin 1200 (e.g., a=1 can map to first storage shelf 1102 and a=2 can map to second storage shelf 1104), coordinate "b" identifies the level 1110-1140 of the storage bin 1200 (e.g., b=1 can map to the top level and b=4 can map to the bottom level) and "c" identifies the longitudinal position of the storage bin 1200 within the level (e.g., c=1 can map to storage bins 1200 closest to station rail entry segment 1410 and c=16 can identify storage bins 1200 closest to station rail exit segment 1450). Referring to FIG. 1, storage bin 1200a can have coordinates (1, 3, 2) and storage bin 1200b can have coordinates (2, 1, 15).

To simplify the filling process, PS 5000 can rank storage bins 1200 based on the coordinates. For example, ranks 1-16 can be respectively assigned to storage bins 1200 with coordinates (1, 1, 1-16). Ranks 17-32 can be respectively assigned to storage bins 1200 with coordinates (1, 2, 1-16), and so on such that ranks 113-128 are respectively assigned to storage bins 1200 with coordinates (2, 4, 1-16).

Other coordinate and ranking systems can be applied. For example, storage bins 1200 (and thus items 20) can be ranked based on level before longitudinal position. Thus, storage bins 1200 with coordinates (1, 1-4, 1) can be respectively ranked 1-4, storage bins 1200 with coordinates (1, 1-4, 2) can be respectively ranked 5-8, and so on.

Before a batch of containers 500 is released into station rail filling segment 1430, PS 5000 can, at block 908, create a hierarchy of the ordered items 20 based on their ranks. Ordered items 20 with a low rank (e.g., rank 1) can appear at the top of the list and ordered items with a high rank (e.g., rank 128) can appear at the bottom of the list. At block 914, PS 5000 can assign the lowest ranked item (e.g., rank 1) to the scanned first container 500 in the batch of released containers 500 and can assign the highest ranked item (e.g., rank 128) to the last scanned container 500 in the batch of released containers 500.

At block 916, PS 5000 can present locations the items 20/bins 1200 assigned to the scanned containers 500 to user 10 (e.g., by presenting coordinates of the item 20/bin 1200 and/or lighting up bin 1200). At block 918, user 10 can fill the scanned containers 500 with items 20 from the bins 1200). Blocks 912-918 can occur in sequence for each container 500. For example, the first container 500 in the batch can be scanned, assigned an item 20/bin 1200, and filled before the second container 500, and so on.

At block 920, the filled containers 500 can depart filling station 1000 via station rail exit segment 1450. For example, the user 10 can slide the filled containers 500 to a motor disposed on station rail segment 1430, 1440, or 1450. The user 10 can activate the motor. The motor can cause the filled containers 500 to follow station rail exit segment 1450 to external rail system 4010. At block 920, PS 5000 can actuate switch 4300a to admit empty containers 500 traveling along external rail system 4010 into filling station 1000 to replace the filled containers 500. Method 900 can then repeat for a new set of orders and items.

We claim:

1. A system comprising:
    a rail comprising an entry portion, an exit portion, and a middle portion disposed between the entry and exit portions, the middle portion being lower than the entry and exit portions, the rail being configured to couple with a container such that the container is movable, along the rail, from the entry portion to the exit portion;
    a first storage rack disposed on a first side of the rail middle portion and a second storage rack disposed on an opposing side of the rail middle portion;
    switches along the rail configured to direct containers at diverging points along the rail; and
    a processing system configured to:
        actuate a first switch of the switches to direct a set of containers to the rail entry portion, the set of containers being empty;
        receive an order;
        analyze the order based on an inventory of the first storage rack and the second storage rack;
        cause a first container of the set of containers to move, via a motor, from the rail entry portion to the rail middle portion based on the analysis;
        receive a scan of the container;
        identify a first storage location based on the scan;
        cause the first storage location to be indicated;
        cause the first container to move, via the motor, from the rail middle portion to the rail exit portion; and
        actuate a second switch of the switches to direct a second container of the set of containers to move, via the motor, from the rail entry portion to the rail middle portion based on the analysis to replace the first container.

2. The system of claim 1 further comprising a plurality of containers moveably coupled to said rail, each of the plurality of containers comprising a vessel and a container connection assembly.

3. The system of claim 2 wherein each container connection assembly of the plurality of containers comprises one or more bearings for slidably coupling a respective one of the plurality of containers to said rail.

4. The system of claim 3 wherein each of said entry portion, exit portion, and middle portion comprise at least one rail channel, and wherein at least one bearing of at least one of said plurality of containers is disposed in said rail channel to thereby moveably couple a respective one of said plurality of containers to said rail channel.

5. The system of claim 1 wherein said rail further comprises an intermediate downsloping portion extending between said entry portion and said middle portion.

6. The system of claim 5 wherein said rail further comprises an intermediate upsloping portion extending between said middle portion and said exit portion.

7. The system of claim 6 wherein said entry portion and said exit portion are collinear.

8. The system of claim 1 further comprising at least one motor configured to move the container along said rail.

* * * * *